United States Patent [19]

Spranger

[11] Patent Number: 5,002,668
[45] Date of Patent: Mar. 26, 1991

[54] HOUSING CONTAINING A PENETRABLE MEMBRANE SEALING AN EVACUATION OUTLET

[75] Inventor: Kurt Spranger, Ammerbuch/Entirgen, Fed. Rep. of Germany

[73] Assignee: Gambro Dialysatoren GmbH & Co. KG, Fed. Rep. of Germany

[21] Appl. No.: 237,514

[22] Filed: Aug. 26, 1988

[30] Foreign Application Priority Data

Aug. 31, 1987 [SE] Sweden ................... 8703366

[51] Int. Cl.$^5$ .................. B01D 63/06; B01D 65/10
[52] U.S. Cl. .................. 210/321.79; 210/321.88; 210/500.23; 55/158
[58] Field of Search ............ 210/321.65, 321.69, 210/321.71, 321.78, 321.79, 321.87, 321.88, 500.21, 500.23; 55/158

[56] References Cited

U.S. PATENT DOCUMENTS

| | | | |
|---|---|---|---|
| 4,125,468 | 11/1978 | Joh et al. | 210/321.1 |
| 4,190,537 | 2/1980 | Tondreau et al. | 210/321.65 |
| 4,252,651 | 2/1981 | Soderstrom | 210/321.65 |
| 4,514,295 | 4/1985 | Mathieu et al. | 210/321.65 |
| 4,834,873 | 5/1989 | Burrows | 210/321.65 |
| 4,880,534 | 11/1989 | Burrows | 210/321.65 |

FOREIGN PATENT DOCUMENTS

| | | |
|---|---|---|
| 2818214 | 10/1979 | Fed. Rep. of Germany . |
| 8623037 | 3/1987 | Fed. Rep. of Germany . |
| 2514647 | 4/1983 | France . |
| 61-109573 | 5/1986 | Japan . |

Primary Examiner—Robert A. Dawson
Assistant Examiner—Wanda L. Millard
Attorney, Agent, or Firm—Lerner, David, Littenberg, Krumholz & Mentlik

[57] ABSTRACT

The present invention relates to a diffusion and/or filtration apparatus, including a housing consisting of a cylindrical open-ended main part closed by two end caps and being provided with an inlet and outlet for a first fluid and at least one outlet for a second fluid having a penetrable membrane, said first fluid being adapted to flow through the fibers of a bundle of semipermeable hollow fibers arranged between two end walls within the housing and said second fluid being adapted to be removed from the space outside the fibers through said at least one outlet for the second fluid.

7 Claims, 2 Drawing Sheets

HOUSING CONTAINING A PENETRABLE MEMBRANE SEALING AN EVACUATION OUTLET

FIELD OF THE INVENTION

The present invention relates to diffusion and/or filtration apparatus. More particularly, the present invention relates to such apparatus including a housing with a cylindrical open-ended main portion closed by two end caps. Still more particularly, the present invention relates to such apparatus whereby a bundle of semipermeable hollow fibers, an inlet and an outlet for a first fluid adapted to flow through the fibers, and an outlet for a fluid to be removed from the space outside of the hollow fibers between the ends of the housing which includes a penetrable membrane. The present invention also relates to blanks for the main portion of such housings and to methods of manufacturing such apparatus.

BACKGROUND OF THE INVENTION

Diffusion/filtration devices are used for different kinds of medical treatment, such as hemodialysis, hemofiltration, plasmapheresis and immunotherapy. Other fields of use for such devices are for instance dialysis in general and filtration in general, for example in connection with cleaning or desalination of sea water.

In connection with the production of devices of the above kind, each end of a housing with a bundle of fibers placed therein is normally enclosed in a casting mold into which the material for the adjacent end wall is fed in a liquid condition, thereby penetrating into and around the fibers. This penetration is controlled by the casting in a manner such that the penetration into the fibers is less than that around the fibers, making it possible to open the ends of the fibers by making a transverse cut between the surfaces defined by the two different penetration depths.

The manner in which the end walls may be molded is described in more detail, for example, in EP-B-0 165 478, and U.S. Pat. Nos. 4,227,295 and 4,329,229, as well as in copending U.S. patent application Ser. No. 237,504.

Before molding the end walls, the inside of the fibers, as well as the outside of the fibers, are normally flushed by a cleaning liquid. This flushing is normally performed in a separate housing having the simple form of an open-ended tube. If, instead, it should be performed in the final housing of the diffusion/filtration device, there is the risk that a portion of the cleaning liquid may remain in the housing, especially in inlets and outlets arranged in the housing wall.

SUMMARY OF THE INVENTION

One object of the present invention is to provide a diffusion and/or filtration apparatus in which the above-discussed flushing of the fibers before the molding of the end walls may be made in the final housing of the apparatus without the above-mentioned risks. According to the present invention, these and other objects have now been realized by using a special blank for the main part of the diffusion and/or filtration apparatus housing, with the completed housing consisting of a cylindrical open-ended main portion closed by two end caps and being provided with an inlet and an outlet for a first fluid and a second outlet for a second fluid. The first fluid is adapted to flow through the fibers of a bundle of semipermeable hollow fibers arranged between two end walls within the housing, and the second fluid is adapted to be removed from the space outside the fibers through the second outlet.

The blank is characterized in that the second outlet, which is arranged in the main part of the housing, is temporarily closed by a penetrable membrane which prevents the flushing liquid from entering it.

Specifically, a diffusion/filtration apparatus in accordance with the present invention comprises a housing which defines a longitudinally extending internal chamber including a first end and a second end. A bundle of semipermeable hollow fibers is disposed within the internal chamber, with the hollow fibers extending longitudinally from the first end of the housing to the second end of the housing Thus, the hollow fibers also have a first end and a second end which correspond to the first end and the second end of the housing. Additionally, the hollow fibers have an outer surface.

First inlet means for the introduction of a fluid into the first end of the housing and first outlet means for the evacuation of a fluid from the second end of the housing are also provided. Additionally, second outlet means for the evacuation of a fluid from the internal chamber of the housing are provided at a location between the first and second ends of the housing. This second outlet includes a penetrable membrane.

The blank is preferably also provided with a second inlet for this other fluid, which is also closed by a penetrable membrane. Such a second inlet is necessary, if the apparatus is intended to be used for dialysis, for example. If on the other hand it is intended only to be used for filtration, a second inlet is not necessary, as a second outlet for the filtrate is all that is required for filtration.

When completed, the second outlets and inlets of the apparatus in accordance with the present invention are at least partly opened in that the penetrable membrane, or membranes, have been penetrated.

This penetration can be made in such a way that a portion of the penetrated membrane is disposed at an angle in relation to the opening created by the penetration. As a result, the membrane will serve as a baffle, guiding the flow of this second fluid.

The second outlet for the second fluid, and possible other outlets and inlets for this second fluid, consist preferably of a nipple arranged on the wall of the housing, which is separated from the fiber bundle by a fluid distribution channel. An advantage of this construction is that the membranes may be penetrated easily without damaging the fiber bundle.

The present invention also relates to a method of manufacturing a diffusion and/or filtration apparatus in accordance with the present invention.

The method is characterized in that the second outlet for the second fluid, which is arranged on the main part of the housing is closed by a temporary closure before the inside and outside of the hollow fibers is flushed by the special flushing fluid. The fibers are arranged within the cylindrical open-ended main part of the housing, whereafter the ends of the fibers are molded into the end walls and opened by transversely cutting the entire apparatus. Whereupon, the apparatus is finally provided with two end caps.

Specifically, the method of the present invention comprises the steps of; providing a bundle of semipermeable hollow fibers, these hollow fibers having a first end, a second end, outer surfaces and inner surfaces; providing a housing which defines a longitudinally extending internal chamber including a first end and a second end, and second outlet means for the evacuation of the internal chamber, the second outlet means being sealed from the internal chamber by a penetrable membrane; inserting the bundle of hollow fibers into the internal chamber; flushing the inner and outer surfaces of the bundle of hollow fibers and the internal chamber of the housing with a flushing solution, inserting a predetermined quantity of a potting material to a predetermined penetration of the internal chamber, thus sealing the internal chamber from the ends of the hollow fibers; cutting the housing, the potting material and the hollow fibers transverse the internal chamber at a predetermined point between the inlet and the penetration of the potting material and attaching lid means over the first and second ends of the housing; and flushing the inside of the hollow fibers a second time in order to remove any possible contamination caused by the cutting.

Additionally, the penetrable membrane provides the possibility of making the above described baffles, which guide the flow of the second fluid. The penetrable membrane or any other temporary closure is preferably arranged close to the inside wall of the cylindrical open-ended main part of the housing.

Preferably, after the opening of the ends of the hollow fibers the fibers are flushed a second time in order to remove any possible contamination due to the cutting.

DETAILED DESCRIPTION

Figure 1:
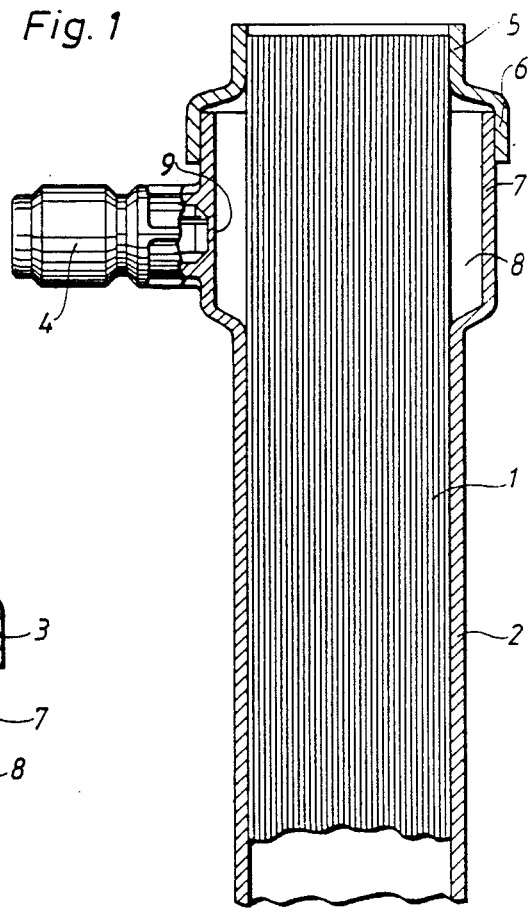
FIG. 1 is a partial, side elevational partially sectional view of an apparatus according to the present invention, at a first stage of its manufacture.
Figure 2:
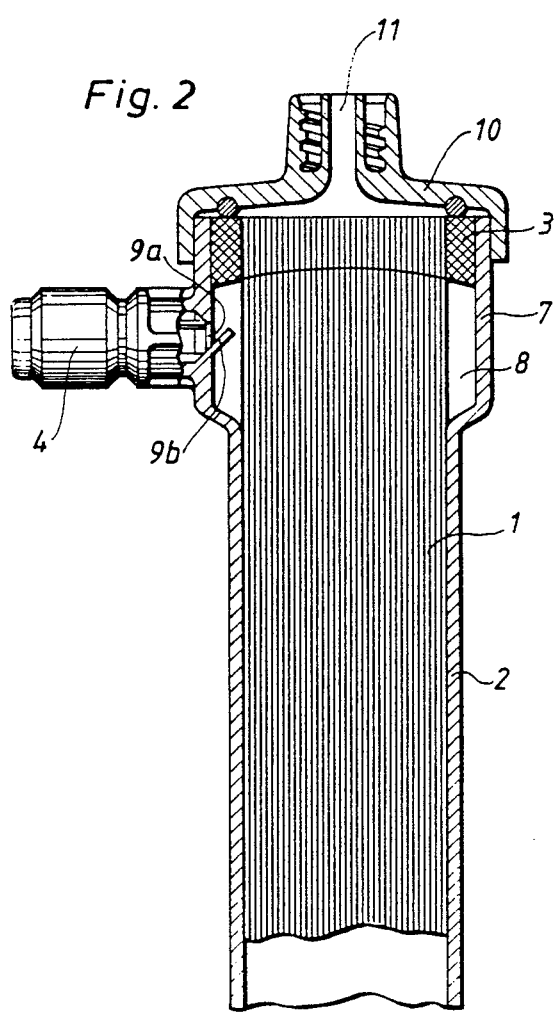
FIG. 2 is a partial, side, elevational, partially sectional view of the apparatus of FIG. 1 at a final stage of its manufacture.

Referring next to the figures, in which like reference numerals refer to like portions thereof, FIG. 1 shows a bundle of hollow fibers 1 in a housing 2 before the molding of the end walls 3, as shown in FIG. 2. A nipple 4, intended to serve as the above mentioned second outlet, is arranged at an enlarged part 7 of the housing 2. At the end of the fibers 1, the bundle is supported by a restricted portion 5 of a ring 6. This ring 6 is intended to serve as an inlet and/or an outlet for a special flushing liquid intended for flushing the inside and the outside of the fibers before the casting of the end wall 3. As described more in detail in copending U.S. patent application Ser. No. 237,504 filed simultaneously with the present application, this ring 6 can also be modified to serve as a part of the mold for the end wall 3.

The nipple 4 is, as mentioned above, arranged on an enlarged part 7 of the housing 2, which provides a distribution channel 8 for any liquid taken into or out of the apparatus through the nipple 4.

In the blank shown in FIG. 1 the inner opening of the nipple 4 is closed by a penetrable membrane 9. As shown in FIG. 2 this membrane may be. partially penetrated in order to provide an opening 9a and an obliquely arranged baffle 9b, also shown in FIG. 3a.

Figure 3B:
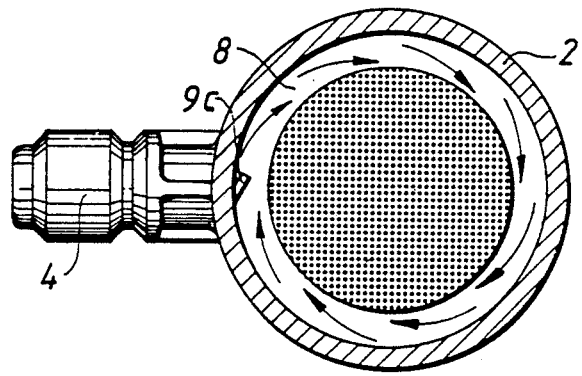
FIG. 3b is a top, elevational, partially sectional view of another embodiment of the apparatus shown in FIG. 2.
Figure 3A:
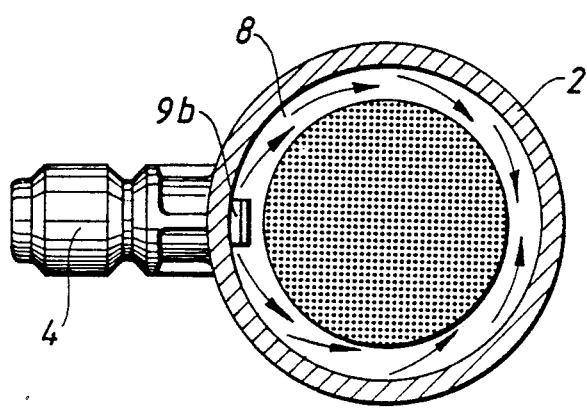
FIG. 3a is a top, elevational, partially sectional view of the apparatus of FIG. 2, taken along Line I—I thereof.

The baffle may be formed by a heated die, and as a result of the form of the die it can either be given the form 9b shown in FIG. 3a or the form 9c shown in FIG. 3b. Thus, providing different guidance for the fluid either entering or leaving through the nipple 4.

After the casting of the end walls 3 the ends of the fibers are opened by transversably cutting through the end walls and through the enlarged parts 7 of the housing 2. After a second flushing of the opened ends of the fibers, the apparatus is finally provided with a lid 10 with an inlet and/or outlet 11 for the fluid which is intended to be sent through the fibers.

As mentioned above, the invention also relates to a method of manufacturing a diffusion and/or filtration apparatus in accordance with the present invention, i. e:, including a housing 2 which consists of a cylindrical open ended main portion closed by two end caps 10 and an inlet and an outlet 11 for a first fluid and a second outlet 4 for a second fluid. The first fluid is thus adapted to flow through the bundle of semipermeable hollow fibers arranged between two end walls within the housing, and the second fluid is adapted to be removed from the space outside the fibers through the second outlet.

The method is characterized in that the second outlet 4 for the second fluid, which is arranged in the main portion of the housing, is closed by a temporary closure before the inside and outside of the bundle of hollow fibers is flushed by a special flushing fluid. Thereafter, the ends of the fibers are molded into the end walls of the housing and opened by transversely cutting the entire apparatus. Whereupon, the apparatus is finally provided with the two end caps 10.

The temporary closure is preferably provided by a penetrable membrane 9 arranged close to the inside wall of the cylindrical open-ended main part.

Additionally, in order to remove any possible contamination caused by the cutting of the fibers, the now unitary structure is preferably flushed a second time.

Specifically, the method of the present invention includes the steps of: providing a bundle of semi-permeable hollow fibers 1, the bundle of hollow fibers 1 having a first end, a second end, outer surfaces, and inner surfaces;

Providing a housing 2 which defines a longitudinally extending internal chamber including a first end and a second end and second outlet means 4 for the evacuation of the internal chamber, the second outlet means being sealed from the internal chamber by a penetrable membrane 9, the penetrable membrane 9 being arranged close to the inside wall of the housing 2;

Inserting the bundle of hollow fibers 1 into the internal chamber, and flushing the inner and outer surfaces of the bundle of hollow fibers 1 and the internal chamber of the housing with a flushing solution;

Inserting a predetermined quantity of a potting material to a predetermined penetration of the internal chamber, the potting material sealing the internal chamber from the ends of the hollow fibers;

Cutting the housing, the potting material and the hollow fibers transverse the longitudinal line defined by the internal chamber at a predetermined point between the inlet and the penetration of the potting material thus forming a sealed internal chamber;

Flushing the inside of the hollow fibers a second time in order to remove any possible contamination caused by the cutting; and Attaching lid means 10 over the first and second ends of said housing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A diffusion/filtration structure comprising:
   (a) housing means, said housing means defining a longitudinally extending internal chamber including a first end and a second end;
   (b) a bundle of semi-permeable hollow fibers disposed within said internal chamber, said hollow fibers extending longitudinally from said first end of said housing to said second end of said housing, said hollow fibers having an outer surface, and a first end and a second end corresponding to said first end and said second end of said housing means;
   (c) first inlet means for the introduction of a fluid into said first end of said housing means;
   (d) first outlet means for the evacuation of a fluid from said second end of said housing means; and
   (e) second outlet means for the evacuation of a fluid from said internal chamber disposed at a location between said first and second ends of said housing means;
   (f) said second outlet means, including a penetrable membrane at an internal location proximate said internal chamber sealing said second outlet means from said internal chamber.

2. The structure according to claim 1 including second inlet means for the introduction of a fluid into said internal chamber disposed at a location between said first end and said second end of said housing means, said second inlet means including a penetrable membrane sealing said second inlet from said internal chamber.

3. The structure according to claim 1 wherein said penetrable membrane include a penetrated portion defining an opening between said second outlet means and said internal chamber.

4. The structure according to claim 3 wherein said penetrated portion of said penetrable membrane includes baffle means protruding into said internal chamber for directing the flow of said fluid within said internal chamber.

5. The apparatus according to claim 1 wherein said second outlet means includes a hollow nipple extending from said housing, said penetrable membrane being disposed between said hollow nipple and said internal chamber.

6. The apparatus according to claim 5 wherein said penetrable membrane is disposed proximate said internal chamber.

7. The apparatus according to claim 1 wherein said first end of said housing means includes an enlarged portion defining an annular space between said bundle of semi-permeable membranes and said housing means, and wherein said second outlet means is located in juxtaposition with said annular space, whereby said annular space can act as a distribution channel for said fluid being evacuated from said internal chamber.

* * * * *